April 8, 1952　　A. B. HAMMITT ET AL　　2,592,028

SEALING WASHER

Filed June 13, 1946

INVENTORS
ANDREW B. HAMMITT
HERBERT L. BIRUM, Jr.
BY
Albert Sperry
ATTORNEY

Patented Apr. 8, 1952

2,592,028

UNITED STATES PATENT OFFICE 2,592,028

SEALING WASHER

Andrew B. Hammitt and Herbert L. Birum, Jr.,
Trenton, N. J.

Application June 13, 1946, Serial No. 676,562

7 Claims. (Cl. 85—50)

This application is a continuation in part of our copending application Serial No. 642,636, filed January 22, 1946.

Our invention relates to constructions for securing sheet material to the structural framework of a building and particularly to means for sealing openings in the sheet material through which fastening means extend.

It is usual in securing sheet material, such as roofing and siding material, to the structural framework of a building to drill or form an opening in the sheet material through which fastening means extend. It is necessary to seal such openings in order to produce a water-tight construction and while this always presents a problem the situation is considerably aggravated when using corrugated sheet material because the surface in which the opening is formed is not flat and the sides of the openings do not lie in a flat plane. Additional problems are also presented in sealing openings which are substantially larger than the fastening means which extend therethrough. Furthermore, when the fastening means is provided with a nut or other retaining element located on the exterior of the sheet material, it also is necessary to cover or protect the nut and any projecting portions of the fastening means to prevent rusting or corrosion thereof.

In accordance with our invention the sealing of openings in sheet material is effected by employing novel means deformable to engage the sides of the opening through which fastening means extend whether the sheet material is corrugated or not and whether the opening is relatively large or small. Further, we prefer to provide covering and protecting means for enclosing a nut or retaining element engaging the fastening means as well as the end of the fastening means itself to prevent rusting or corrosion thereof.

One of the objects of our invention is to provide novel forms of sealing means for the openings in sheet material through which fastening means extend.

Another object of our invention is to provide novel means for protecting the exposed end of fastening means used in securing sheet material to building framework.

A further object of our invention is to provide a novel type of sealing means adapted for use in sealing openings in corrugated sheet material.

These and other objects and features of our invention will appear from the following description thereof in which reference is made to the figures of the accompanying drawing.

Figure 1:
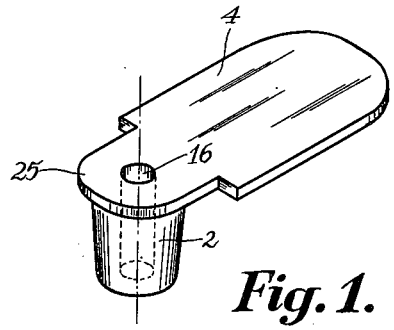
Fig. 1 is a perspective of one form of sealing means embodying our invention.
Figure 2:
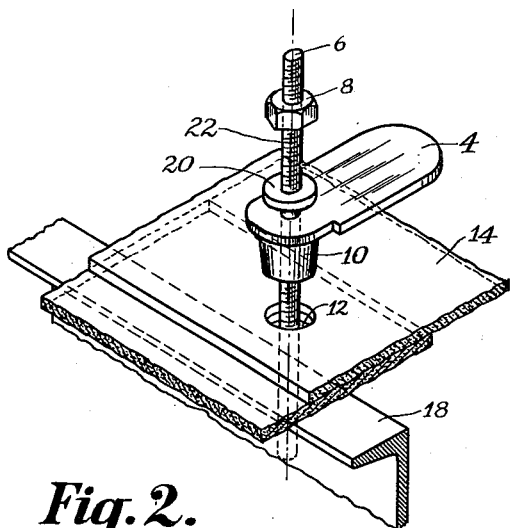
Fig. 2 is a perspective illustrating the manner of assembling the sealing means of Fig. 1 with fastening means for a roof.
Figure 3:
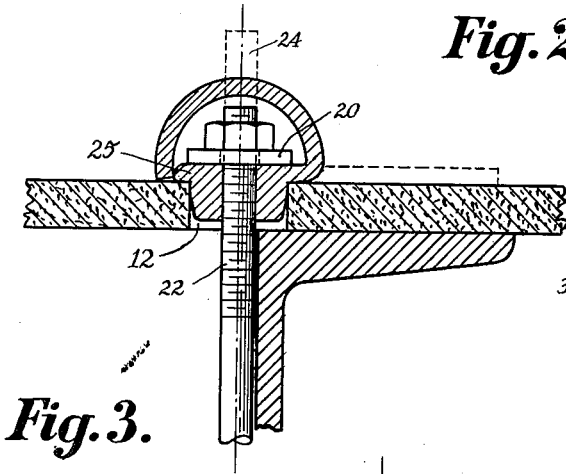
Fig. 3 is an enlarged vertical sectional view of the construction illustrated in Figs. 1 and 2 in its finished form.

In that form of our invention illustrated in Figs. 1, 2 and 3 the sealing means is shown comprising a body 2 having an extension 4 on the upper portion thereof which is such shape and dimensions that it may be turned over the end of the fastening means 6 and retaining means 8 to form a protective cover for the exposed elements of the assembly as shown in Fig. 3. The sealing means preferably is formed of lead, Babbitt metal, soft copper or other deformable material adapted for sealing the opening in the sheet material. The body 2 of the sealing means is in the form of a truncated cone having tapered side walls 10 adapted to extend into an opening 12 in sheet material 14 to which the sealing means is applied and having an opening 16 therethrough to receive the fastening means 6.

In applying the sealing means of Fig. 1 to roofing or siding as shown in Figs. 2 and 3 the bolt or fastening means 6 extends through the opening 12 in the sheet material and engages the structural framework 18 of the building. The fastening means may be of any preferred type but when applied from the exterior of the building the opening 12 is generally considerably larger in diameter than the adjacent portion of the fastening means 6. In any case the lower or smaller end of the body 2 is designed to extend into the opening 12 and about the fastening means when forced into contact with the sheet material by the washer 20 and the nut or retaining means 8 engaging threads 22 on the projecting end of the fastening means. The retaining means 8 when drawn up to press against the washer 20 serves to force the body 2 into the opening 12 and thereby deforms or molds the body of the sealing means so that it not only presents a sealing contact with the side walls of the opening 12 but also is in sealing contact with the washer 20 and to some extent with the threads 22 of the fastening means.

After the fastening means has thus been applied to secure the sheet material to the building framework and to urge the sealing means into sealing contact with the sides of the opening 12, the projecting end of the fastening means, shown in dotted lines at 24 in Fig. 3, is cut off close to the retaining means 8. The extension 4 of the sealing means then is folded or turned over and hammered or otherwise pressed down about the nut 8 and washer 20 and the flange 25 which projects about the upper end of the body 2. In this way a protective cover is provided for the exposed portions of the fastening means and a permanent and watertight seal produced. Moreover, the sealing means serves to support the fastening means against lateral displacement and holds it firmly in position with respect to the sheet material so that all looseness or play is taken up and a rigid construction is assured.

Figure 4:
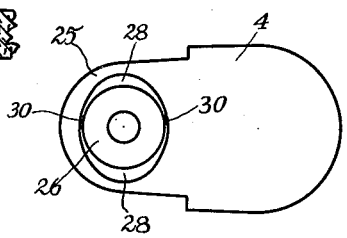
Fig. 4 is a bottom plan view of a modified form of sealing means generally similar to Fig. 1.
Figure 5:
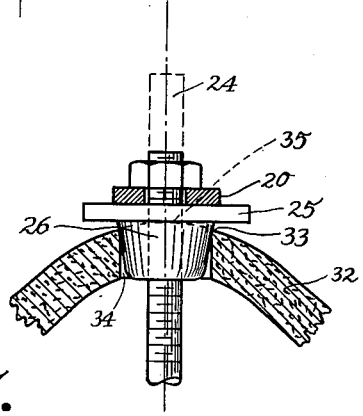
Fig. 5 is a vertical sectional view through corrugated sheet material to which the fastening means of Fig. 4 is applied.

In that form of our invention shown in Figs. 4 and 5 the body of the sealing means is shaped to insure contact between the sealing means and the sides of the opening in the sheet material even though the sheet material is corrugated. For this purpose the body 26 is formed so that it is generally oval in cross section adjacent flange 25 at the upper or larger end thereof. The sides 28 of the body at opposite ends of the longer axis of the oval portion of the body thus extend outward to engage the sides of the opening in the sheet material 32 at points 33 below the crest of the corrugation as indicated more clearly in Fig. 4. At the same time the sides 30 of the body at opposite ends of the shorter axis of the oval portion of the body engage points 35 of sides of the opening in the sheet material at the crest of the corrugations. A tight seal is thus afforded throughout the edges of the opening even before deformation of the body by the retaining means and washer and a positive water-tight contact between the sealing means and sheet material is provided.

In each of the forms of our invention shown and described the sealing means is adapted for application from the exterior of the sheet material for sealing the openings through which fastening means extend, and for protecting the exposed portions of the fastening means. However, it will be understood that our invention is also applicable to constructions in which the fastening means are secured in place by means located on the interior of the sheet material and applied by workmen on a scaffolding supported within the building. Furthermore, additional caulking and sealing means may be used in combination with the elements described, although this is not generally necessary. It will also be understood that numerous other forms and embodiments of our invention may be made without departing from the spirit and scope of our invention, and therefore it should be understood that the particular constructions described above and shown in the figures of the drawings are intended to be illustrative only, and are not intended to limit the scope of our invention.

We claim:

1. A device for sealing an opening in the crest of corrugated sheet material comprising sealing means having a body presenting a tapered surface, the smaller end of which is of smaller diameter than said opening, and the larger end of which is of oval cross section and formed so that the sides of the body adjacent the opposite ends of the longer axis of the larger end of the body are engageable with the sides of the opening below the crest of the corrugated material, said body having an opening extending axially therethrough for receiving fastening means.

2. A device for sealing an opening in the crest of corrugated sheet material comprising sealing means having a body presenting a tapered surface, the smaller end of which is of smaller diameter than said opening, and the larger end of which is of oval cross section and formed so that the sides of the body adjacent the opposite ends of the longer axis of the larger end of the body are engageable with the sides of the opening below the crest of the corrugated material, said body having an opening therethrough for receiving fastening means, fastening means extending through said opening, and a retaining member engageable with the fastening means and said body for forcing said body into said opening.

3. Means for protecting the end of a fastening element projecting through an opening in corrugated sheet material comprising an oval shaped body portion having a hole therethrough for receiving said fastening element, means extending at right angles to the longer axis of said body member and at either side thereof for engaging the crown portion of said corrugated sheet material, and means extending from said engaging means to cover said body portion when reversely folded thereover, all of said elements being formed out of deformable material and being integrally united.

4. In a building structure embodying a framework element having corrugated sheet material applied thereto by fastening means which have a threaded end extending through an opening in the sheet material on the crest of a corrugation and engaged by retaining means, the combination of means for sealing said opening comprising a member which engages said fastening means and has a tapered body the smaller end of which extends into said opening and the larger end of which is of generally oval cross sections and positioned with those portions of the body adjacent the ends of the shorter axis of said oval engaging the sides of the opening at the crest of the corrugation and those portions of the body adjacent the ends of the longer axis of said oval engaging the sides of the opening at points spaced from the crest of the corrugation, said retaining means urging said sealing member into engagement with said sheet material.

5. In a building structure embodying a framework element having corrugated sheet material applied thereto by fastening means which have a threaded end extending through an opening in the sheet material on the crest of a corrugation and engaged by retaining means, the combination of means for sealing said opening comprising a member which engages said fastening means and has a tapered body the smaller end of which extends into said opening and the larger end of which is of generally oval cross sections and positioned with those portions of the body adjacent the ends of the shorter axis of said oval engaging the sides of the opening at the crest of the corrugation and those portions of the body adjacent the ends of the longer axis of said oval engaging the sides of the opening at points spaced from the crest of the corrugation, said retaining means urging said sealing member into engagement with said sheet material, and means extending over said retaining means and the threaded end of said fastening means and cooperating with said body to enclose the retaining means and fastening means.

6. In a building structure embodying a framework element having corrugated sheet material applied thereto by fastening means which have a threaded end extending through an opening in the sheet material on the crest of a corrugation and engaged by retaining means, the combination of means for sealing said opening comprising a member which engages said fastening means and is formed of deformable material, said member having a tapered body the smaller end of which extends into said opening and the larger end of which is of generally oval cross sections and positioned with those portions of the body adjacent the ends of the shorter axis of said oval engaging the sides of the opening at the crest of the corrugation and those portions of the body adjacent the ends of the longer axis of said oval engaging the sides of the opening at points spaced from the crest of the corrugation, said retaining means urging said sealing member into engagement with said sheet material.

7. In a building structure embodying a framework element having corrugated sheet material applied thereto by fastening means which have a threaded end extending through an opening in the sheet material on the crest of a corrugation and engaged by retaining means, the combination of means for sealing said opening comprising a member which engages said fastening means and is formed of deformable material, said member having a tapered body the smaller end of which extends into said opening and the larger end of which is of generally oval cross sections and positioned with those portions of the body adjacent the ends of the shorter axis of said oval engaging the sides of the opening at the crest of the corrugation and those portions of the body adjacent the ends of the longer axis of said oval engaging the sides of the opening at points spaced from the crest of the corrugation, said retaining means urging said sealing member into engagement with said sheet material, said body having a portion integral therewith extending over the retaining means and the threaded end of the fastening means to protect the same from weather.

ANDREW B. HAMMITT.
HERBERT L. BIRUM, JR.

REFERENCES CITED

The following references are of record in the file of this patent:

UNITED STATES PATENTS

| Number | Name | Date |
| --- | --- | --- |
| 1,015,907 | Ryder | Jan. 30, 1912 |
| 1,356,404 | Robinson | Oct. 19, 1920 |
| 2,288,710 | Hotchkin | July 7, 1942 |
| 2,381,352 | Hotchkin | Aug. 7, 1945 |

FOREIGN PATENTS

| Number | Country | Date |
| --- | --- | --- |
| 391,668 | Great Britain | May 4, 1933 |
| 823,539 | France | Oct. 18, 1937 |